United States Patent [19]

Horchler

[11] Patent Number: 5,450,787
[45] Date of Patent: Sep. 19, 1995

[54] TWINE CLAMP FOR ROUND BALER TWINE WRAPPING APPARATUS

[75] Inventor: Fred M. Horchler, Lancaster, Pa.

[73] Assignee: New Holland North America, Inc., New Holland, Pa.

[21] Appl. No.: 372,522

[22] Filed: Jan. 12, 1995

[51] Int. Cl.⁶ .............................................. B65B 13/18
[52] U.S. Cl. .......................................... 100/5; 56/341; 100/13; 242/149
[58] Field of Search ......................... 100/5, 13, 88, 89; 56/341, 343; 242/149

[56] References Cited

U.S. PATENT DOCUMENTS

| | | | |
|---|---|---|---|
| 3,910,178 | 10/1975 | Eggers et al. | 100/5 |
| 4,062,279 | 12/1977 | Grube et al. | 100/5 |
| 4,182,235 | 1/1980 | Harig | 100/5 |
| 4,282,804 | 8/1981 | Cools | 100/5 |
| 4,457,226 | 7/1984 | Meiers | 100/13 |
| 4,619,193 | 10/1986 | Crew | 100/13 |
| 4,956,968 | 9/1990 | Underhill | 100/88 |
| 5,215,006 | 6/1993 | Jennings et al. | 100/5 |

Primary Examiner—Stephen F. Gerrity
Attorney, Agent, or Firm—Frank A. Seemar; Larry W. Miller

[57] ABSTRACT

Twine wrapping apparatus for a round baler having a bale forming chamber with a generally transverse crop infeed opening. The apparatus is mounted forward of the opening and includes a twine arm for dispensing twine into the chamber to wrap cylindrical packages of crop material formed therein. Coupling means provide for swinging movement of the arm through a predetermined path during at least a portion of which the arm dispenses twine in the vicinity of the opening. The twine arm includes a clamp having one member affixed to the outer end of the twine arm and a second member that is moveable relative to the first member and is urged thereagainst by a spring assembly to provide a clamping force for holding the twine. The spring assembly includes a spring maintained in compression.

7 Claims, 4 Drawing Sheets

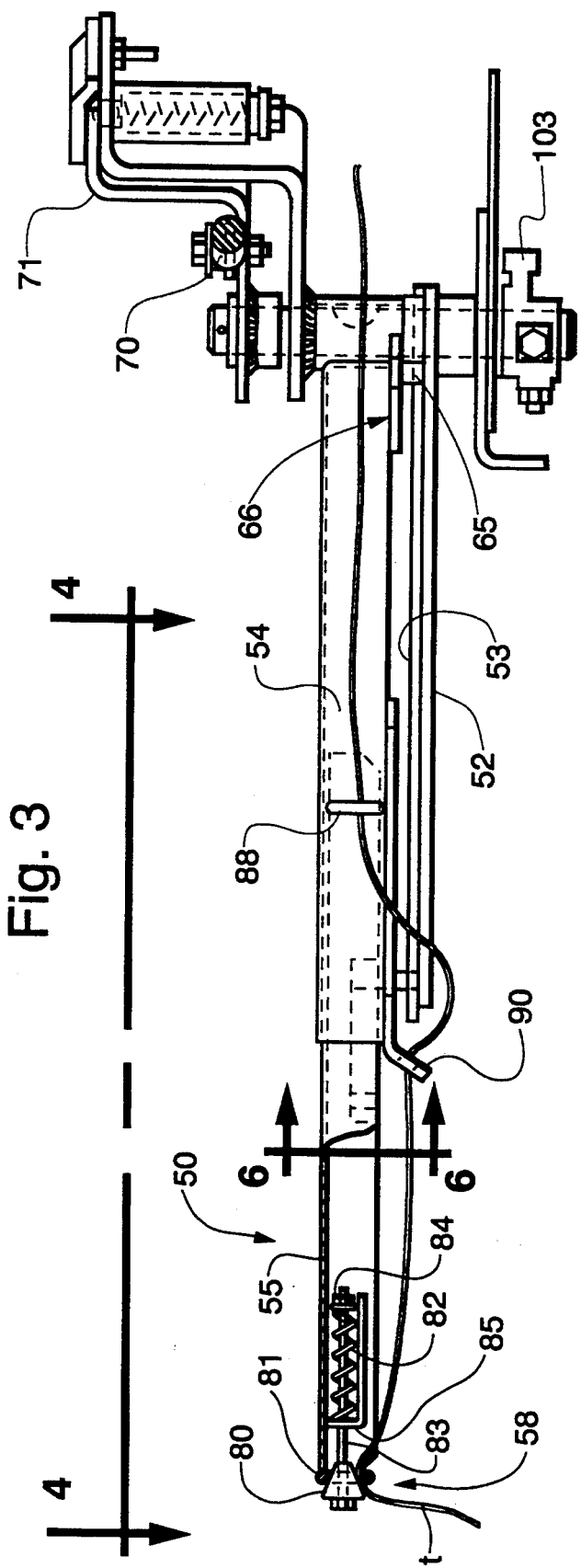

TWINE CLAMP FOR ROUND BALER TWINE WRAPPING APPARATUS

FIELD OF THE INVENTION

This invention, relating generally to a baler for forming cylindrical bales of crop material, commonly referred to as a round baler, is directed to an improved twine arm for round baler twine wrapping apparatus. More particularly, this invention is concerned with an improvement to the twine clamp disclosed in U.S. Pat. No. 5,215,006, issued Jun. 1, 1993 in the name of Richard E. Jennings, et al, and assigned to a common assignee.

BACKGROUND OF THE INVENTION

Round balers have a bale forming chamber defined by an apron comprising an array of belts, chains, and/or rolls within which the cylindrical bale is formed. Crop material such as hay is picked up from the ground as the baler traverses the field and is fed into the chamber where it is rolled up to form a compact cylindrical package. Wrapping apparatus is provided for securing the package to form a bale while still in the forming chamber. The bale is then ejected from the chamber onto the ground for subsequent handling. A commonly known wrapping apparatus utilizes one or more twine dispensing arms for feeding twine to the circumference of the formed cylindrical package. Lateral traversal of the arm or arms results in a helical wrap around the package as it is turned in the chamber.

There are various prior art approaches for wrapping twine to maintain the compactness of the package when the bale is ejected. In most or all of these it is important that the initial free end of the twine strand, commonly referred to as the "tail", is consistently of sufficient length to assure that the wrapping operation is immediately and properly carried out. To accomplish this the twine is sometimes clamped after it has been severed at the completion of the previous wrapping operation. Clamping mechanisms are commonly utilized in the wrapping apparatus and in some instances are mounted on the twine arm to prevent loss or shortening of the tail due to slack in the system when the twine is cut.

Also of concern in twine wrapping apparatus is convenience of initially threading twine in a new baler or rethreading the twine when the supply becomes depleted. The twine is supplied from balls located in compartments on the baler. It is fed out of the compartments and guided along a path to the twine tube and ultimately to the dispensing end of the tube. During threading, the lead end is drawn along its path from the storage compartment and then through the wrapping apparatus. If clamps are employed they must be disengaged to permit threading and then reengaged to permit normal operation. When twine is pulled during wrapping from the dispensing tube it is desirable that it not be unduly impeded by such clamps disposed along its path.

Usually some kind of tensioning device is provided to apply tension to the twine as it is being wrapped around the package to improve bale compactness and stability. But, if such tensioning causes hesitation in the grasping of the tail, the wrapping start is delayed and baler reliability could be affected. Thus, controllable tension and tail length are important interrelated aspects of reliable round bale wrapping.

SUMMARY OF THE INVENTION

An important object of the present invention is to provide an improved round baler twine wrapper with enhanced durability and reliability.

In pursuance of this and other important objects the present invention provides an improved twine wrapping apparatus for a round baler having a bale forming chamber, a crop infeed opening in the chamber, and a twine handling assembly mounted in the vicinity of the infeed opening for dispensing twine through the opening for wrapping a round bale formed in the chamber. The twine handling assembly includes an arm having an improved outwardly disposed twine dispensing end for dispensing twine, and means for swinging the arm to move the twine dispensing end across the infeed opening as twine is being dispensed.

According to the broadest aspect of the invention, apparatus of the type above is provided wherein the improved twine dispensing end includes a unique clamp assembly comprising a first member affixed to the outer end of the arm, a second member moveable relative to the first member, and resilient means for urging the second member against the first member at a predetermined clamping force against the twine therebetween.

More specifically, the unique clamp assembly contemplates a spring, and means for coupling the spring to the second member, the means for coupling adapted to hold the spring under compression to maintain the predetermined clamping force.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE DRAWINGS

FIG. 3 is a view taken in the direction of arrows 3—3 in FIG. 2.

FIG. 4 is a view taken in the direction of arrows 4—4 in FIG. 3.

DESCRIPTION OF THE PREFERRED EMBODIMENT

Figure 1:
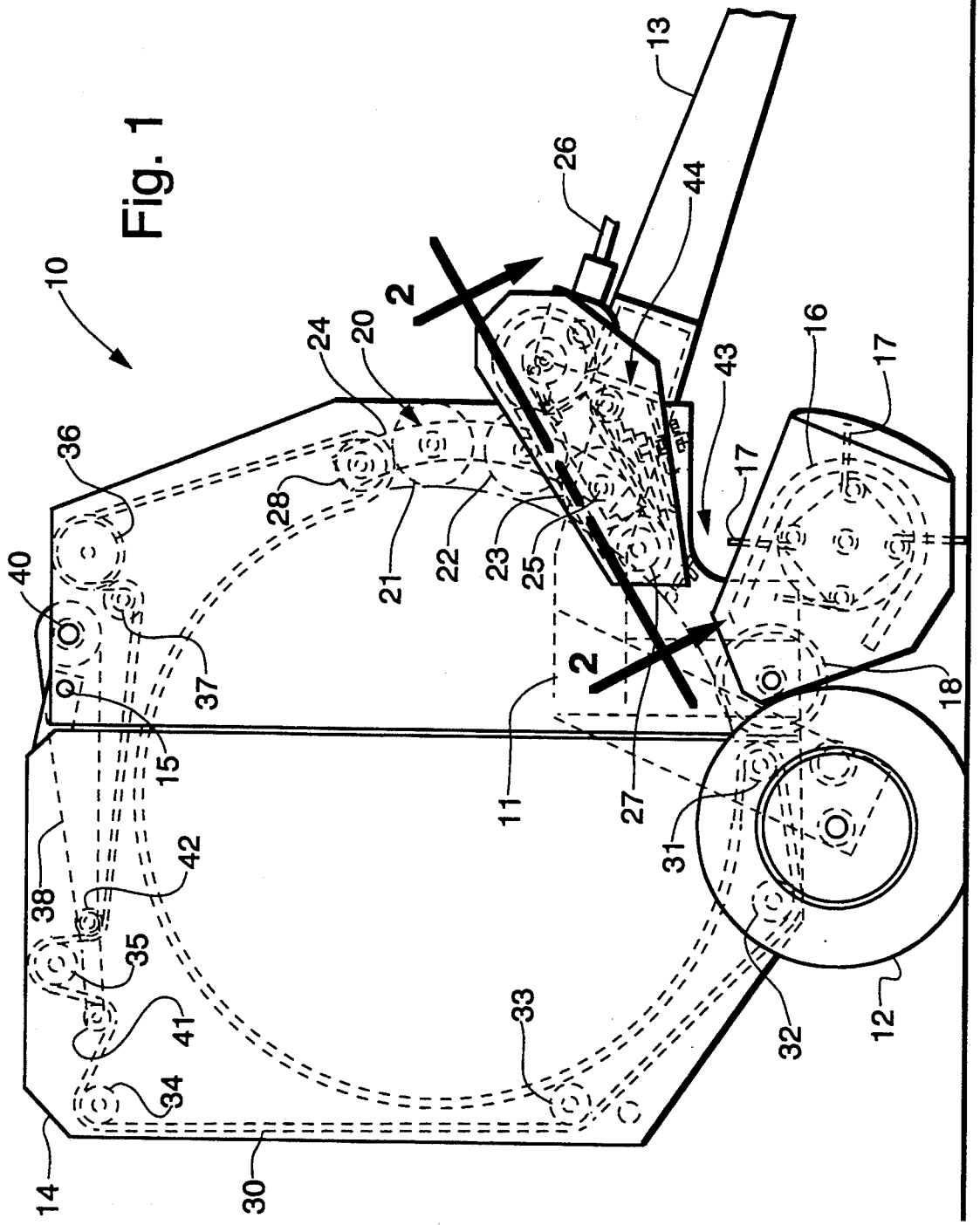
FIG. 1 is a side elevational view of a round baler in which the present invention is embodied.

Referring now to the drawings for a more detailed description of the preferred embodiment of the invention, FIG. 1 shows an expandable chamber round baler 10 of the type disclosed in detail in U.S. Pat. No. 4,956,968 issued on Sep. 18, 1990. It includes a main frame 11 supported by a pair of wheels 12 (only one shown), a tongue 13 on the forward portion of main frame 11 for connection to a tractor, and a tailgate 14 pivotally connected to main frame 11 by stub shafts 15 so that tailgate 14 may be closed as shown in FIG. 1 during bale formation and wrapping or opened to discharge a completed bale. A pickup 16 is mounted on main frame 11 in a conventional manner.

Pickup 16 includes a plurality of fingers or tines 17 movable along a predetermined path to lift crop material from the ground and deliver it toward a floor roll 18 which is rotatably mounted on main frame 11.

The baler depicted in FIG. 1 shows a sledge assembly 20 having a plurality of rollers 21, 22, 23 extending transversely of main frame 11 in an arcuate array common to the type baler described in U.S. Pat. No. 4,956,968, mentioned above.

Rollers 21, 22, 23 are journalled at the ends thereof in a pair of spaced apart arms 24(only one shown) pivotally mounted inside main frame 11 on stub shafts 25 for permitting pivotal movement of the sledge between a bale starting position (shown in U.S. Pat. No. 4,956,968) and the full bale position shown in FIG. 1. Rollers 21, 22, 23 are driven in a counter clockwise direction (as viewed in FIG. 1) by conventional means connected with a drive shaft 26 which is adapted for coupling to a PTO (power take off) of a tractor (not shown). A starter roll 27 is located adjacent roller 23 and is also driven in a counter clockwise direction to strip crop material from roller 23. A freely rotatable idler roller 28 is also mounted on arms 24 for movement with sledge assembly 20.

An apron, generally referred to by reference numeral 30, includes a plurality of continuous flat side by side belts supported by guide rolls 31, 32, 33, 34, 35, rotatably mounted in tailgate 14. Apron 30 is also supported on a drive roll 36 rotatably mounted on main frame 11. Although apron 30 passes between roller 21 and idler roller 28, it is in engagement with only idler roller 28 while roller 21 is located in close proximity to apron 30 to strip crop material from its belts, as referred to above. Conventional means (not shown) couple drive shaft 26 to provide rotation of drive roll 36 in a direction causing movement of apron 30 along the path indicated in broken lines in FIG. 1. An additional guide roll 37 in main frame 11 ensures proper driving engagement between apron 30 and drive roll 36. A pair of take up arms 38 (one shown) are pivotally mounted on main frame 11 by a cross shaft 40 for movement between varying inner and fixed outer positions, corresponding to bale forming and full bale conditions, respectively. The full bale position shown in FIG. 1 will suffice for the proposes of the description of this invention. Further, it should be noted that take up arms 38 carry additional guide rolls 41,42 for supporting apron 30. Resilient means (not shown) are provided to normally urge take up arms 38 toward their inner positions while resisting movement thereof from their inner positions to their outer positions to keep tension on the roll forming belts in a known manner.

As baler 10 is towed across a field by a tractor, pick up tines 17 lift crop material from the ground and deliver it into the bale forming chamber through transverse infeed opening 43, commonly referred to as the throat, which in the baler shown is defined by floor roll 18 and starter roll 27. The crop material fed through throat 43 is continuously coiled in a clockwise direction until the inner courses of apron 30 expand to the position shown in FIG. 1. This formation of a cylindrical package takes place in a well known manner, after which the package is wrapped, tailgate 14 is opened, the bale is discharged rearwardly, tail gate 14 is closed and the baler is again ready to form another bale.

Now turning to the twine wrapping apparatus of the present invention which in its preferred embodiment is adapted to the structure of the above described round baler. It should be noted that it is not intended that its use be limited to balers of this nature, nor to multiple twine arm apparatus, but that the present invention is adaptable for use on most if not all current round balers using single or multiple twine arm wrapping apparatus. Additionally, it will become apparent in the description that follows, that even though the invention is particularly adaptable to telescopic twine arms, the invention is not so limited.

Figure 2:
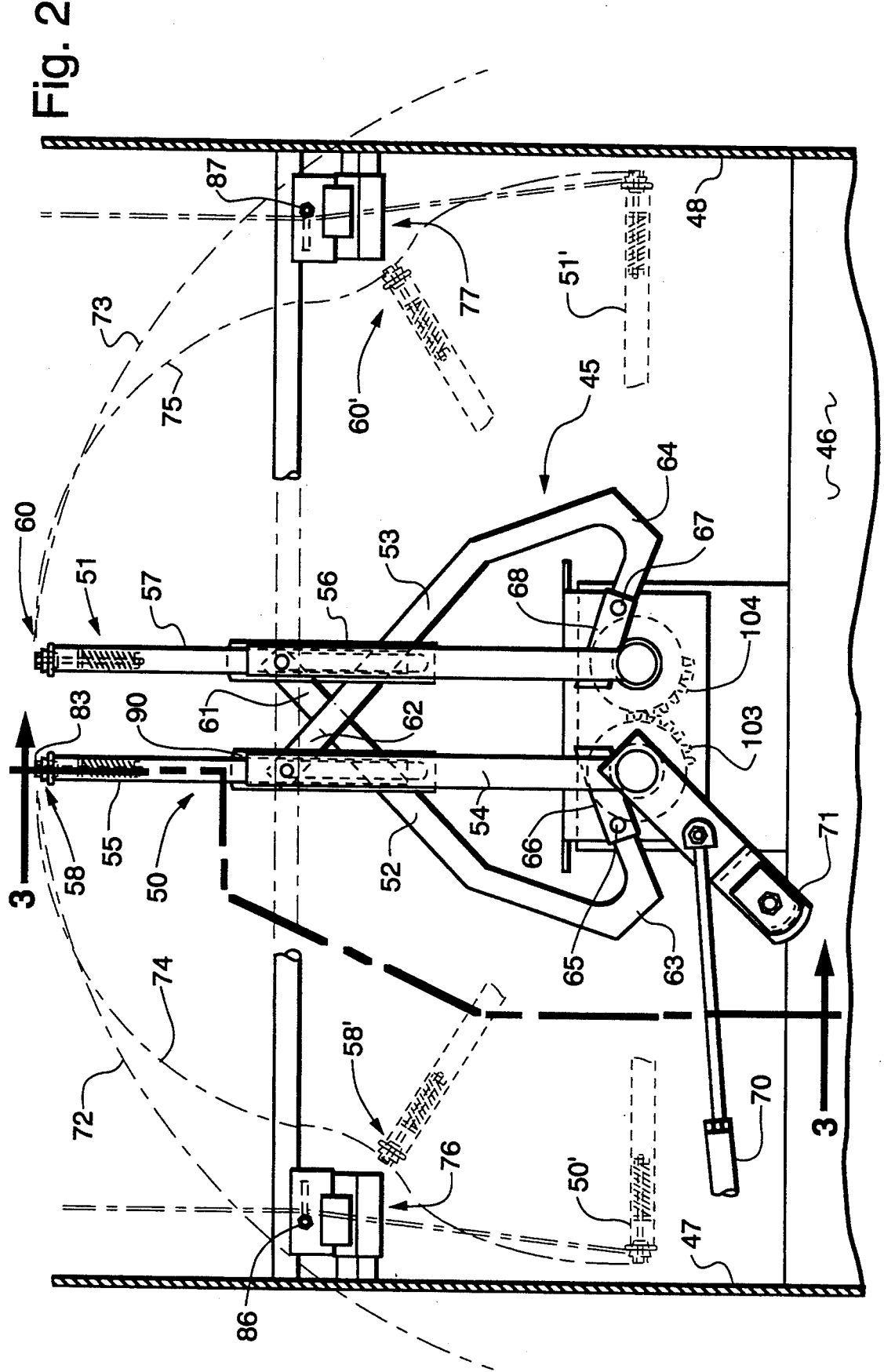
FIG. 2 is a view taken in the direction of arrows 2—2 in FIG. 1.
Figure 5:
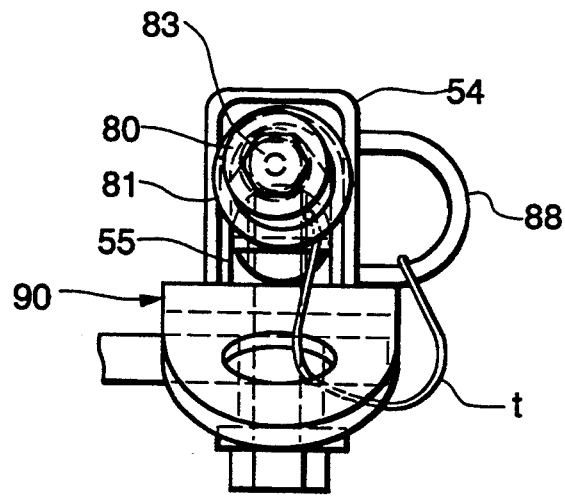
FIG. 5 is a view taken in the direction of arrows 5—5 in FIG. 4.
Figure 6:
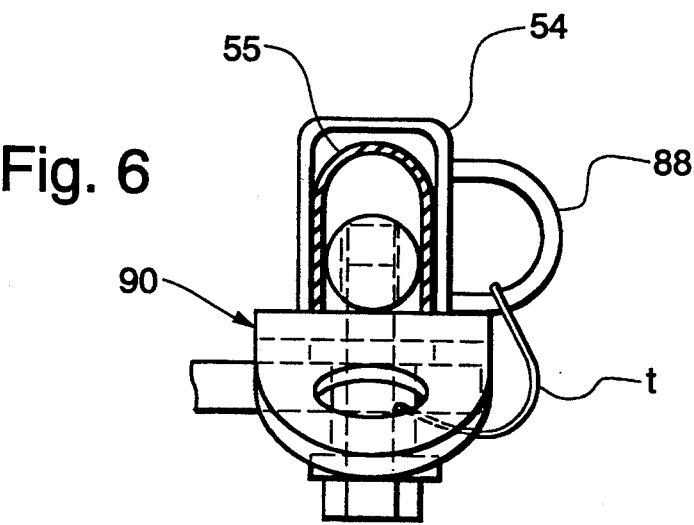
FIG. 6 is a view taken in the direction of arrows 6—6 in FIG. 3.

The wrapping apparatus 44 shown in FIG. 1 is best described by referring first to FIG. 2 where the twine handling assembly, generally referred to by reference numeral 45, is shown mounted on a frame member 46 between sidewalls 47, 48. The assembly includes a pair of twine arms 50, 51 shown in their rearmost extended position and coupled together by first and second link members 52, 53. Each twine arm comprises first and second members 54, 55 and 56, 57, the second members each being telescopically mounted within each corresponding first member, and twine dispensing ends 58, 60 at the outer ends of the second members. The link members each have outer ends 61, 62 and inner ends 63, 64 whereby the outer end of each is pivotally coupled to the second member of one of the twine arms and the inner end is attached to the first member of the other twine arm. More specifically, first link member 52 comprises outer end 61 and inner end 63, the inner end of which is pivotally connected, via a pivot pin 65, to a rigid strap 66, which in turn is affixed to first member 54 of twine arm 50. Likewise, second link member 53 comprises outer end 62 and inner end 64, the inner end of which is pivotally connected, via pivot pin 67, to rigid strap 68, which in turn is affixed to first member 56 of twine arm 51.

Twine arm 50 is driven in a counter clockwise direction and twine arm 51 is driven in a clockwise direction when drive arm 70 rotates driven link 71 and drive gear 103 in a counter clockwise direction to drive meshing gear 104 in a clockwise direction. Due to this twine arm coupling arrangement shown in the wrapping apparatus in which the preferred embodiment of this invention is embodied, the twine arms rotate to the rest positions 50', 51' shown in phantom, with the second member of each arm retracting within the first member of each arm. The path of the twine arms in the fully extended position (without the telescopic capability) would be along arcuate paths 72 and 73. But, with the coupling arrangement shown, curved paths 74 and 75 describe the actual paths along which the outer ends 58', 60' of the twine arms travel. The shape of these paths is interrelated with twine guide assemblies 76, 77, described in detail in the above referenced U.S. Pat. No. 5,215,006, hereby incorporated by reference.

Referring now to the areas of the baler in which the present invention is embodied, twine arm 50, shown in fully extended position in FIG. 3, includes a clamp comprising spool 80, generally conical shaped, secured in a nesting fashion within a ring 81 affixed to the end of twine arm member 55. Spool 80 is urged in a general axial direction along arm 50 into engagement with the inner surface of ring 81 by a spring 82. Spring 82 is coupled to spool 80 by means of a bolt 83 extending through spool 80 and spring 82. A nut 84 is secured to bolt 83 and holds spring 82 in compression against a flange 85, affixed to twine arm 55. Spool 80 is pulled axially by the compressive force of spring 82 to provide a clamping function by holding the portion of the twine, designated by the reference letter "t", between the outer surface of spool 80 and the inner surface of ring 81, i.e., in the vicinity from which it emerges from the twine dispensing end 58. FIG. 4 shows spool 80 in the extended position which is accomplished by manually pulling spool 80 away from the end of twine arm 50 by increasing the compressive force provided by spring 82. This extended position of spool 80 facilitates initial threading of twine through the twine tube, which threading is described in detail in U.S. Pat. No. 5,215,006.

In operation, the twine wrapping apparatus described herein is at rest during bale formation. After a cylindrical package of crop material has been formed in the bale forming chamber the twine arms leave their rest positions shown in phantom in FIG. 2. At that point the twine that has been severed with a tail of desired length extending loosely from the twine dispensing tip is clamped in place by spool 80. The twine arms then swing to the fully extended position shown in FIG. 2 and place the tails, which have maintained their original predetermined length, on floor roll 18 which is rotating in a counterclockwise direction. Floor roll 18 normally has an aggressive surface and that in conjunction with its rotation assures that the twine tails will be fed to the nip between the formed cylindrical package of crop material and the floor roll 18, and then pulled around the cylindrical package by overcoming the tension on the twine. The tension force of the twine clamp can be varied by varying the location of nut 84 along bolt 83. The full extension of the twine arms permits the dispensing tips to start dispensing twine from the extended positions shown in FIG. 2. At that point the twines are continuously pulled from the twine tubes to dispense transversely in a known manner, i.e., the swinging motion of the tubes guide the twines along lateral paths to feed out twine for spirally wrapping the cylindrical package being rotated in the bale chamber.

As the twine tips continue along their paths the twine extends rearwardly from the tube to the bale along a path in a direction generally parallel to the adjacent side wall. The twine eventually comes in contact with guide pins 86, 87 (FIG. 2) to prevent twine wraps from being applied to close to the end surface of the bale, which again is a well known expedient in the round baler art.

An important aspect of the present invention is the convenient location of the twine clamp on the end of the twine tube for reliable twine tail length. The twine cannot back up in the tube. Further, in the baler embodiment shown, the clamp assures that the tail length will be maintained during extension of the tube prior to wrapping. These aspects along with the unique structure of the improved clamp greatly improve any baler twine wrapping apparatus on which this it is incorporated.

Included in the many advantages, explicit and implicit, of the novel apparatus of the present invention and equally as important as the above mentioned advantages is the capability to provide a round baler with a twine wrapper apparatus that is easily serviced. When twine is initially threaded (or rethreaded when the supply is depleted) from the twine balls and thence along convenient guides to the tube, it is fed out manually until it reaches the vicinity of the twine arms. Referring to FIG. 3, the twine is then fed through a readily accessible twine guide loop 88 and then through the aperture in flange 90 affixed to arm member 54. The central location of this aperture serves to maintain the twine in the center and below the U-shaped twine arm members 54 and 55. The end of the twine is then fed through the twine clamp by manually extending spool 80 to the position shown in FIG. 4, against the compression force being exerted by spring 82. After a sufficient amount of the end section of the twine is threaded between spool 80 and ring 81, spool 80 is released and permitted to nest in ring in the clamping position shown in FIG. 3, with a predetermined force maintained by spring 82. The ready access of this twine path serves to simplify the threading function of the wrapping apparatus as does the simple, reliable and novel clamp and ring structure.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:

1. Improved twine wrapping apparatus for a round baler comprising
   a bale forming chamber, a generally transverse opening in said chamber,
   a twine handling assembly mounted in the vicinity of said opening for dispensing twine through said opening for wrapping a round bale formed in said chamber,
   said twine handling assembly including an arm having an outwardly disposed twine dispensing end for dispensing twine,
   said twine handling assembly further including means for swinging said arm to move said twine dispensing end across said opening as twine is being dispensed,
   said twine dispensing end includes a clamp comprising a first member affixed to said outer end of said arm, a second member moveable relative to said first member, and
   resilient means for urging said second member against said first member to clamp twine therebetween at a predetermined clamping force, the improvement comprising
   said resilient means comprises a spring, and
   means for coupling said spring to said second member, said means for coupling adapted to hold said spring under compression to maintain said predetermined clamping force.

2. In twine wrapping apparatus as set forth in claim 1 wherein
   said second member nests with said first member over a continuous surface on said first member.

3. In twine wrapping apparatus as set forth in claim 2 wherein
   said first member is ring shaped.

4. In twine wrapping apparatus as set forth in claim 3 wherein
   said second member is generally conical shaped and is urged axially along said arm against said continuous surface of said first member.

5. In twine wrapping apparatus as set forth in claim 1 wherein
   said means for swinging include drive means for moving said twine dispensing end along a predetermined path in the vicinity of said opening to dispense twine via said clamping mechanism under conditions where said clamping force is overcome during round bale wrapping.

6. In twine wrapping apparatus as set forth in claim 1 wherein said means for coupling comprises a flange extending from said arm, against which flange said spring is compressed.

7. In twine wrapping apparatus as set forth in claim 6 wherein said means for attaching further comprises means for adjusting the compressive force on said spring.

* * * * *